United States Patent [19]

Kobayashi

[11] Patent Number: 5,458,543
[45] Date of Patent: Oct. 17, 1995

[54] BICYCLE MULTIPLE SPROCKET ASSEMBLY

[75] Inventor: Jun Kobayashi, Kawachinagano, Japan

[73] Assignee: Mory Suntour Inc., Osaka, Japan

[21] Appl. No.: 284,422

[22] PCT Filed: Dec. 27, 1993

[86] PCT No.: PCT/JP93/01912

§ 371 Date: Aug. 2, 1994

§ 102(e) Date: Aug. 2, 1994

[87] PCT Pub. No.: WO94/14644

PCT Pub. Date: Jul. 7, 1994

[30] Foreign Application Priority Data

Dec. 28, 1992 [JP] Japan .................................. 4-349153

[51] Int. Cl.$^6$ ........................................ F16H 7/18
[52] U.S. Cl. ............................................ 474/160
[58] Field of Search .......................... 474/152, 155–158, 474/160, 164

[56] References Cited

U.S. PATENT DOCUMENTS 5,192,248 3/1993 Nagano ................. 474/160 X
5,192,249 3/1993 Nagano ................... 474/160

FOREIGN PATENT DOCUMENTS

| 54-56853 | 4/1979 | Japan | B62M 9/10 |
| 63-2392 | 1/1988 | Japan | B62M 9/10 |
| 251192 | 4/1990 | Japan | B62M 9/10 |
| 4212688 | 8/1992 | Japan | B62M 9/10 |
| 5112278 | 5/1993 | Japan | B62M 9/10 |

*Primary Examiner*—Michael P. Buiz
*Attorney, Agent, or Firm*—Michael D. Bednarek; Marks & Murase

[57] ABSTRACT

A bicycle multiple sprocket assembly designed to prevent lateral deflection of a chain from concentrating on a portion of the chain immediately before engaging with a diametrically larger sprocket, and for shifting the chain smoothly and assuredly to a diametrically larger sprocket. The assembly includes at least one diametrically larger sprocket and at least one diametrically smaller sprocket, wherein a side surface of the diametrically larger sprocket facing the diametrically smaller sprocket is provided with a link plate supporting portion 12 or supporting edges of link plates of a chain C so as to bend the chain along a predetermined arc when the chain is shifted from the diametrically smaller sprocket to the diametrically larger sprocket.

5 Claims, 5 Drawing Sheets

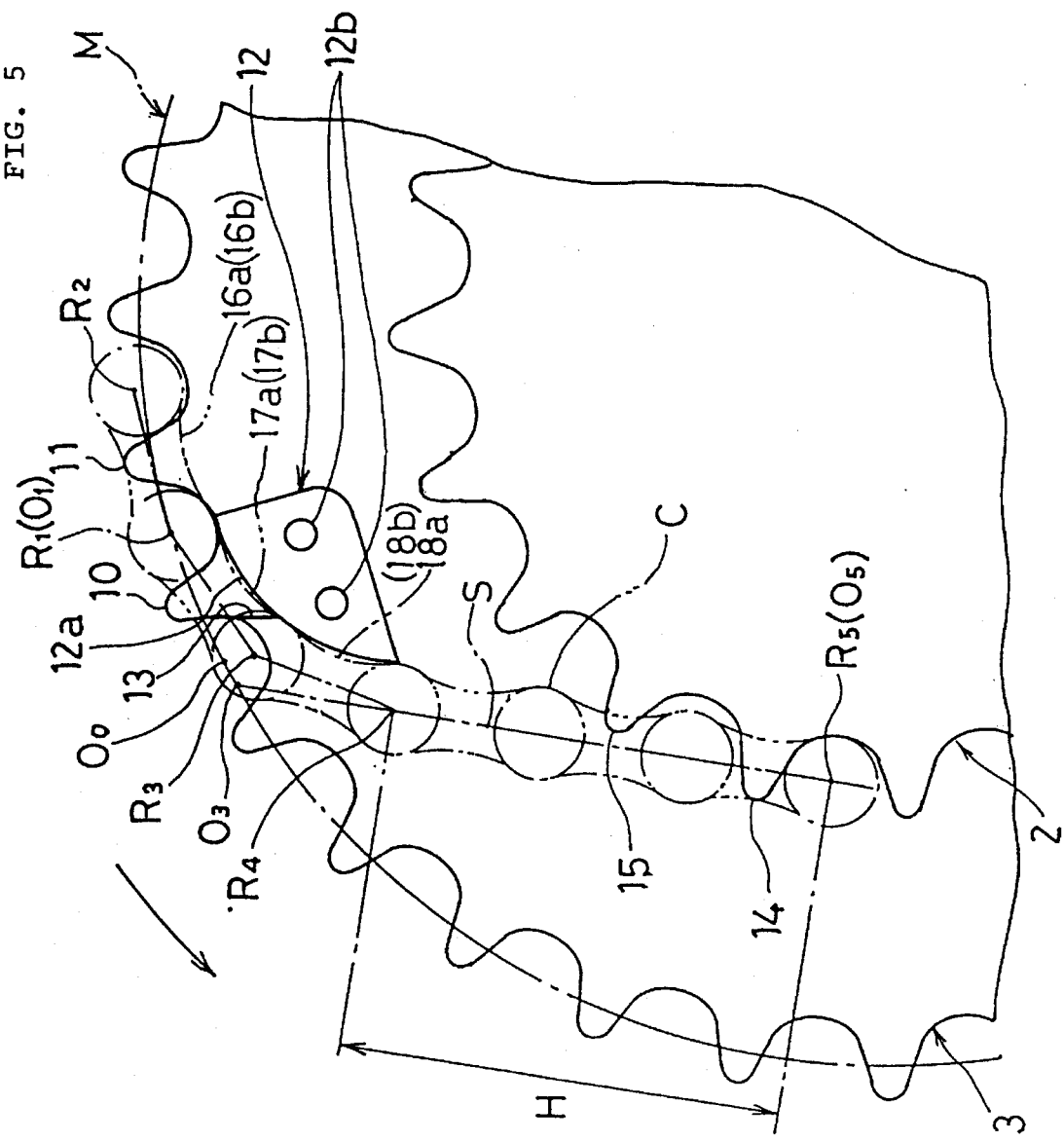

BICYCLE MULTIPLE SPROCKET ASSEMBLY

FIELD OF THE INVENTION

The present invention relates to a bicycle multiple sprocket assembly.

BACKGROUND ART

Recently, many bicycles have been given a greater number of speed steps: A front gear connected to a crank and a rear gear connected to a rear hub each comprises a plurality of sprockets having different numbers of teeth.

These front and rear gears are connected by a chain. A rotational momentum generated by pedalling is received by the crank and front gear, and then transmitted via the chain to the rear gear, thereby turning the rear wheel for the bicycle to move forward.

A speed shifting is made while the multiple sprockets are rotating; the chain is forcibly pressed laterally by a derailleur off a track before engaging with the multiple sprocket, thereby disengaging the chain from a sprocket for engaging with a desired sprocket. Efficiency of this speed shifting is determined by how quickly the chain is disengaged from the sprocket with which it engages presently and how quickly the chain is engaged with the desired sprocket.

The chain is given a predetermined amount of tension by the derailleur. Because of this tension, a chain shifting from a diametrically larger sprocket to a diametrically smaller one can be performed relatively easily: When the chain is disengaged from the diametrically larger sprocket, the tension automatically causes the chain to fall on the diametrically smaller sprocket.

However, when the chain is shifted from a diametrically smaller sprocket to a diametrically larger sprocket, disengaging the chain from the diametrically smaller sprocket is not enough. The chain must be raised against the tension to a height where the chain can be engaged with the diametrically larger sprocket.

For this reason it is generally recognized that a chain shifting from a diametrically smaller sprocket to a diametrically larger sprocket is more difficult than a chain shifting from a diametrically larger sprocket to a diametrically smaller sprocket.

When there is a large difference in the number of teeth between a diametrically larger sprocket and a diametrically smaller sprockets, there is also a large difference in diameter between the two sprockets, resulting in a long portion of the chain to be in transitional state between the diametrically smaller sprocket and the diametrically larger sprocket, making difficult to guide the chain stably to a predetermined teeth furrow on the diametrically larger sprocket.

In an attempt to solve this problem, an invention disclosed in the Japanese Utility Model Publication 63-2392 for example, proposes a multiple sprocket assembly, wherein a side wall of the diametrically larger sprocket facing the diametrically smaller sprocket is provided with a guide wall for supporting the chain to move along a tangential line extending from a furrow center of a pair of teeth on a diametrically smaller sprocket.

By providing the guide wall, it becomes possible to support an intermediate portion of the transitional portion of the chain, thereby securely shifting the chain to the diametrically larger sprocket.

According to the multiple sprocket assembly described in the above Japanese Gazette, the chain moves along a straight line from a teeth furrow center on a diametrically smaller sprocket to another teeth furrow center on a diametrically larger sprocket, and the guide wall is provided along this straight transitional path for supporting the chain's link plate.

However, in this multiple sprocket assembly, the chain having been raised close enough to a tooth of the diametrically larger sprocket must be re-oriented circumferentially of the diametrically larger sprocket before it can engage with the diametrically larger sprocket.

Thus, the chain is subject to a substantial bend along a vicinity of a link plate which is about to engage with the diametrically larger sprocket.

As a result, a link plate running immediately ahead of the link plate to be engaged firstly with the diametrically larger sprocket is pressed onto a side surface of the diametrically larger sprocket. At the same time, the chain's lateral deflection concentrates on the vicinity of the link plate subject to the bend. Thus, the chain and the sprocket teeth are subject to a substantial force.

Especially in the case of the front gear, when the above-described state is followed by further input of driving force, it is likely that a tooth of the diametrically larger sprocket may wedge into a pair of overlapping link plates, damaging the chain or the sprocket's tooth.

DISCLOSURE OF THE INVENTION

It is therefore an object of the present invention to provide a bicycle multiple sprocket assembly wherein the lateral deflection of a chain does not concentrate on a portion of the chain immediately before engaging with a diametrically larger sprocket for assured and smooth shifting of the chain to the diametrically larger sprocket.

The present invention provides a bicycle multiple sprocket assembly having at least one diametrically larger sprocket and at least one diametrically smaller sprocket, wherein a side surface of the diametrically larger sprocket facing the diametrically smaller sprocket is provided with a link plate supporting portion for supporting edges of link plates of a chain so as to bend the chain along a predetermined arc when the chain is shifted from the diametrically smaller sprocket to the diametrically larger sprocket.

Other objects, characteristics and advantages of the present invention will become clear from a preferred embodiment to be described later in reference with attached drawings.

BRIEF DESCRIPTION OF THE DRAWINGS

FIG. 5 is an enlarged view of a primary portion shown in FIG. 1 for describing function of the present invention.

BEST MODE FOR CARRYING OUT THE INVENTION

The present embodiment is an application of the present invention to a front gear of a bicycle.

Figure 1:
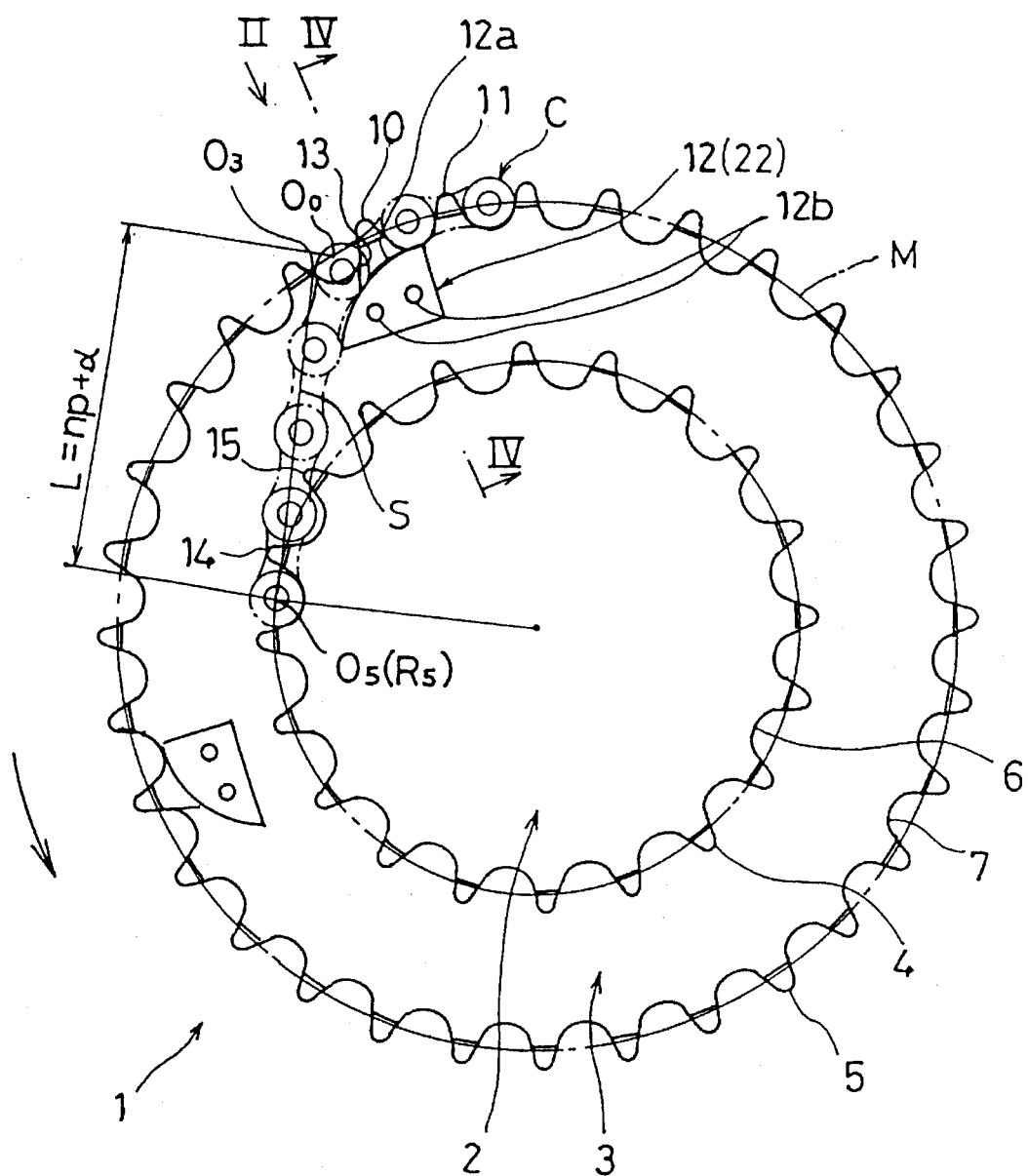
FIG. 1 is a side view of a multiple sprocket assembly according to the present invention.

FIG. 1 is a side view of a multiple sprocket assembly according to the present invention. It should be appreciated to note here that for easier understanding of the following description, representation is made only for one diametrically smaller sprocket 2 and an adjacent diametrically larger sprocket 3; however, the relationship between the diametrically smaller sprocket 2 and the diametrically larger sprocket 3 can be applied to any pair of mutually adjacent sprockets in a multiple sprocket assembly comprising three or more sprockets.

Figure 2:
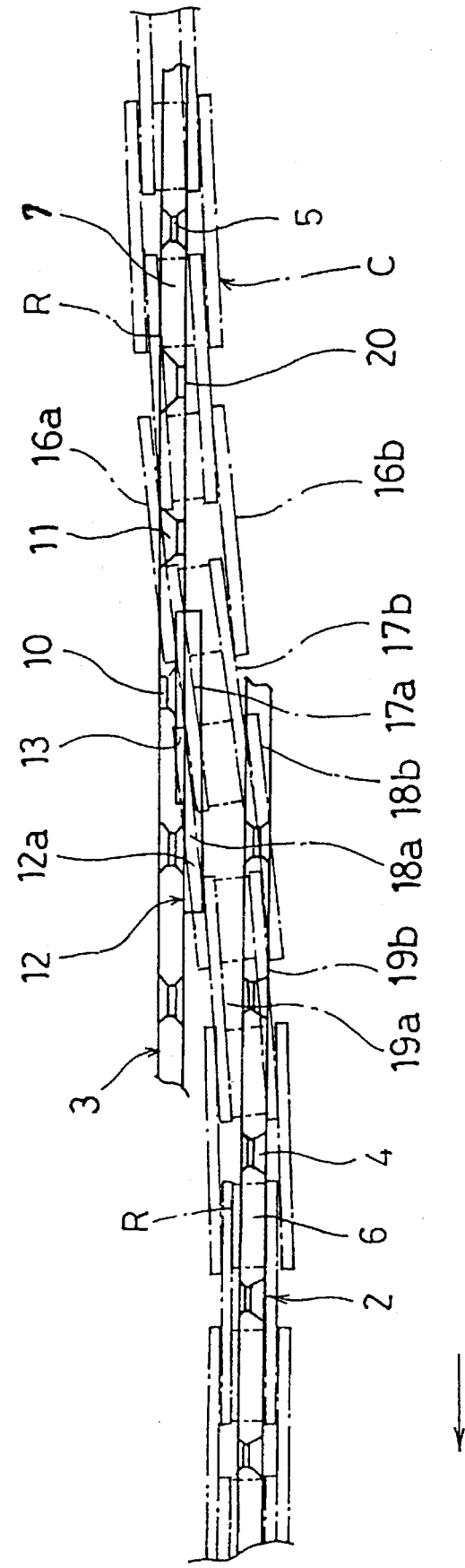
FIG. 2 is a view of the multiple sprocket assembly shown in FIG. 1 viewed from a direction shown by Arrow II for describing function

As shown in FIG. 1, the sprockets 2, 3 are respectively provided with multiple teeth 4, 5 formed at a regular interval on their respective outer circumferences. As shown in FIG. 2 a chain C has a structure wherein a pair of outer link plates 16a, 16b and a pair of inner link plates 17a, 17b are connected in series with a cylindrical roller R provided at each connection. Spaces between the pair of outer link plates 16a, 16b, and between the pair of inner link plates 17a, 17b are filled by the teeth 4, 5 whereas furrows 6, 7 formed between a pair of adjacent teeth are each fitted by the roller R, thus engaging the chain C with the sprockets 2, 3.

Bottom portions of the teeth furrows 6, 7 are formed in an arc of a slightly larger curvature than that of an outer diameter of the roller R, so that the roller R fits the teeth furrow 6, or 7 with a slight amount of backlash.

Now, As shown in FIG. 1, in the present embodiment, a side surface of the diametrically larger sprocket 3 facing the diametrically smaller sprocket is provided with a link plate supporting portion 12 for supporting edges of link plates of the chain C when the chain is shifted from the diametrically smaller sprocket 2 to the diametrically larger sprocket 3.

The link plate supporting portion 12 is provided by a retainer plate 22 having an arcuate supporting face 12a facing radially outward of the sprockets and attached by fixing pins 12b to that side surface of the diametrically larger sprocket 3 facing the diametrically smaller sprocket.

As shown in FIG. 5, the supporting face 12a is formed in an arcuate shape extending forwardly of the sprocket's rotation and outward radially of the sprocket. Furthermore, a rear edge portion of the arc is formed to have a smooth continuation with another arc formed by connecting teeth furrows of the diametrically larger sprocket 3.

As shown in FIG. 5, the supporting face 12a is formed to have an arc long enough for supporting a series of two link plates.

Figure 4:
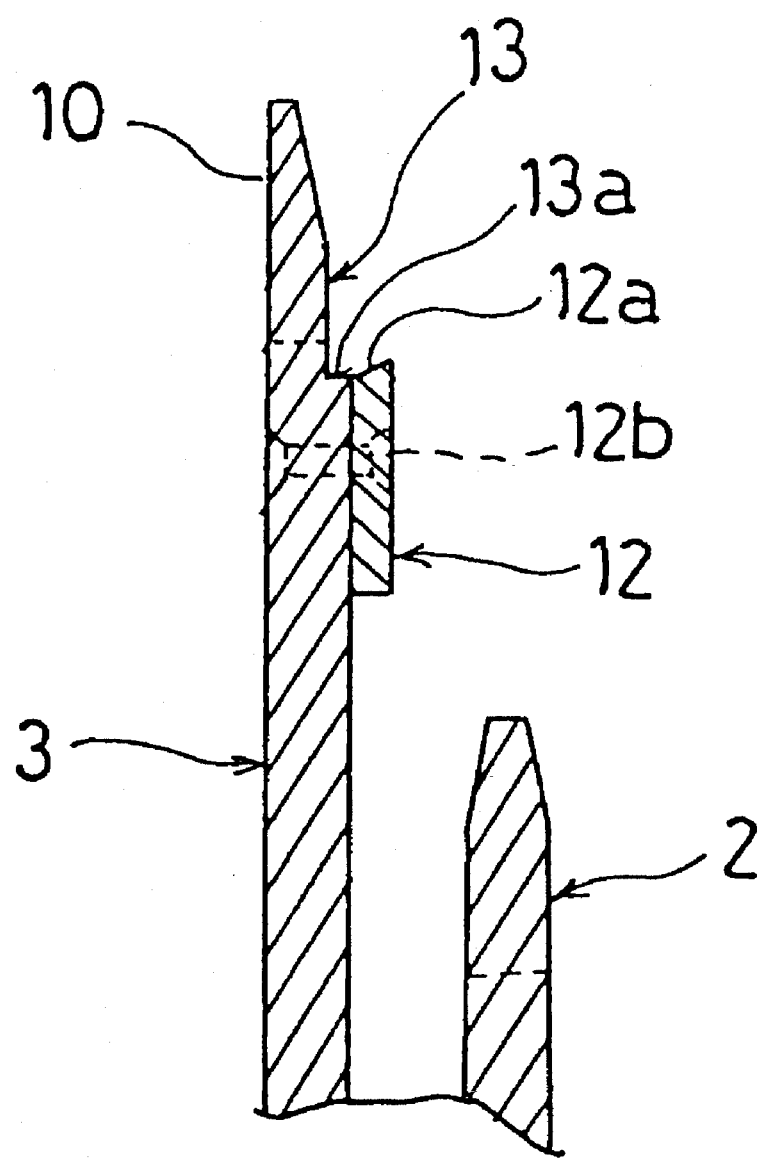
FIG. 4 is a cross-sectional view taken along Line IV—IV in FIG. 1.

As shown in FIG. 4, the supporting face 12a is inclined to have an edge located closer to the diametrically smaller sprocket and radially outward from another edge located closer to the diametrically larger sprocket.

On the other hand the side face of diametrically larger sprocket 3 is formed with a notch 13 having a step face 13a continuous with the supporting face 12a. The notch 13 is formed by carving the side surface of the diametrically larger sprocket 3 or carving a side face of a tooth 10.

With the arrangement described hereinabove, the multiple sprocket assembly 1 will be described next in its function.

First, as shown in FIG. 5, the chain C leaves the diametrically smaller sprocket 2 for an outer circumference of the diametrically larger sprocket 3 along a tangent S drawn from a furrow center $O_5$.

The link plate supporting portion 12 has the arcuate supporting face 12a extending forwardly of the sprocket's rotation and outward radially of the sprocket. Thus, the link plate 18a is turned clockwise relative to the tangent S around a connecting portion $R_4$ as in FIG. 5, being held at an angle along the supporting face 12a. Following the link plates 18a, 18b, link plates 17a, 17b are also turned around $R_3$ and held along the arc of the supporting face 12a. Then, link plates 16a, 16b which follow the link plates 17a, 17b run over a tooth 11 of the diametrically larger sprocket 3, thereby beginning to engage with the diametrically larger sprocket 3.

In other words, according to the present embodiment, the chain C is moved along a straight path between a connected portion $R_5$ on the furrow center $O_5$ and the connected portion $R_4$, that is, the portion represented by symbol H while being moved along an arcuate path from the connected portion $R_4$ to the point where the chain starts to engage with the tooth 11.

Hence, as the chain C approaches the teeth of diametrically larger sprocket 3, the link plates receive smooth change in direction along the arc until engaged by the tooth 11 of the diametrically larger sprocket 3. For this reason, there is no concentration of bend on the link plates immediately before the link plates 16a, 16b engaging firstly with the diametrically larger sprocket 3.

Further, the link plates 17a, 17b, 18a, 18b located ahead along the rotational path of the link plates 16a, 16b to be engaged firstly with the diametrically larger sprocket 3 are not subject to excessive press onto the side surface of the diametrically larger sprocket 3. Thus, the chain's lateral deflection does not concentrate on a particular portion of the chain, alleviating the force acting on the chain C and the tooth of the diametrically larger sprocket 3, thereby eliminating the possible damage on the chain C or the tooth 11 of the diametrically larger sprocket 3.

Further, the link plate supporting portion 12 can stably support the chain C being shifted from diametrically smaller sprocket 2 to the diametrically larger sprocket 3. Thus, the chain C can be assuredly and smoothly shifted from the diametrically smaller sprocket 2 to the diametrically larger sprocket. Even when there is a big difference in the number of teeth between the diametrically smaller sprocket 2 and the diametrically larger sprocket 3, it is possible to stably shift the chain C to the diametrically larger sprocket 3, enabling an assured speed change operation.

Still further, according to the present embodiment, the link plates 16a, 16b which are to run over and engage with the tooth 11 of the diametrically larger sprocket are held tangentially to a pitch circle M of the diametrically larger sprocket. Thus, the link plates 16a, 16b can be brought to engagement with the tooth 11 substantially tangentially to the pitch circle of the diametrically larger sprocket 3.

By being able to engage the chain C with the diametrically larger sprocket 3 substantially tangentially to the pitch circle M, the conventional problems resulting from a diametrical difference between the diametrically smaller sprocket 2 and the diametrically larger sprocket 3 are eliminated, making possible to shift the chain C as if between a parallel pair of sprockets of the same diameter, and thereby making the chain shifting smooth and assured.

Furthermore, according to the present embodiment, the supporting face 12a is inclined, and the diametrically larger sprocket 3 is formed with a notch 13 having a step face 13a continuous with the supporting face 12a as shown in FIG. 4. Thus, it is possible to assuredly hold link plates of the chain C on the supporting face 12a. The notch 13 also prevents interference between a link plate and the side surface of the diametrically larger sprocket 3.

Still further, as shown in FIG. 1, an arrangement is made in this embodiment for circumferential relative positioning between the diametrically smaller sprocket 2 and the diametrically larger sprocket 3, wherein the distance L, or the distance from a furrow center $O_0$ located adjacent to an intersection point $O_3$ of the pitch circle M to the furrow center $O_5$ on the diametrically smaller sprocket 2 is set to np+α (where; p represents a chain pitch, n represents an integer, and α represents a dimensional value smaller than a tooth height of the diametrically larger sprocket.)

In a conventional multiple sprocket, the chain moves along a straight path from one furrow center of the diametrically smaller sprocket to another furrow center of the diametrically larger sprocket. For this reason, an arrangement had to be that the tangential distance between the two furrow centers from the diametrically smaller sprocket to the diametrically larger sprocket should substantially be equal to the arithmetic product of the chain pitch and an integer so that a chain's connected portion can engage smoothly with the diametrically larger sprocket when it reaches the outer circumference of the diametrically larger sprocket.

In the present invention, however, since the chain C does not move in a straight path, but in an arcuate path, an additional transitional distance must be provided. According to the present embodiment, therefore, the intersection point $O_3$ between the tangent S from the furrow center $O_5$ of the diametrically smaller sprocket 2 and the pitch circle of the diametrically larger sprocket 3 does not correspond to a furrow center of the diametrically larger sprocket.

For this reason, according to the present invention, the distance L, or the distance between the furrow center $O_0$ and the furrow center $O_5$ of the diametrically smaller sprocket 2, is set to np+α, for the circumferential relative positioning between the diametrically smaller sprocket 2 and the diametrically larger sprocket 3. With this arrangement it is possible to lead a connected portion $R_1$ of the chain C to fall onto a teeth furrow located behind the furrow center $O_0$ along the rotational path.

A value of α in the above formula may be a value smaller than the teeth height of the diametrically larger sprocket, for example.

With the above arrangement for setting the circumferential relative positioning between the diametrically larger sprocket 3 and the diametrically smaller sprocket 2, and with the provision of the link plate supporting portion 12 adjacent to the furrow center $O_0$, it is possible to securely hold the chain C with the link plate supporting portion 12 thereby shifting the chain C smoothly to the diametrically larger sprocket 3.

The scope of the present invention should not be limited to the embodiment described hereinabove.

For example, the present invention applied to a front gear in the embodiment can also be applied to a rear gear.

The shape and location of the link plate supporting portion are not limited to those adopted in the embodiment. For example, it is of course possible to provide a link plate supporting portion having an arcuate supporting face capable of supporting three link plates.

Means for providing the link plate supporting portion is not limited to what is used in the embodiment, either; according to Claim 4 for example, it is possible to provide an integrally formed bulge having an arcuate supporting face by means of a press forming method.

Figure 3:
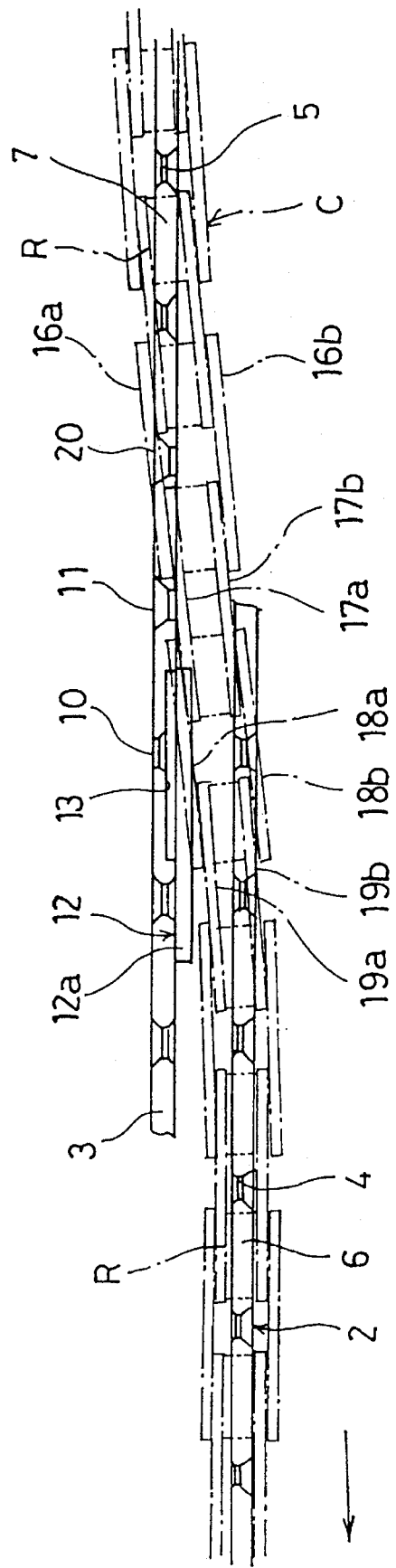
FIG. 3 is a view showing another state of a chain shifting, representing a view corresponding to FIG. 2.

Furthermore, in the embodiment, a description was made for a case wherein the arcuate supporting face 12a supports edges of link plates throughout the entire span of the arc; however, the same effect is achieved in a case wherein only a portion of the supporting face 12a supports a bottom edge of a link plate as shown in FIG. 3.

Still further, in the embodiment, the chain C was first moved in a straight path and then in an arcuate path; however, it is also possible to move the chain in an arcuate path immediately after leaving the diametrically smaller sprocket.

I claim:

1. A bicycle multiple sprocket assembly for engagement with a chain, the chain comprising pairs of link plates connected together by link rollers, the sprocket assembly comprising at least one diametrically larger sprocket and at least one diametrically smaller sprocket, wherein the larger sprocket has a side surface facing the smaller sprocket, said side surface of the larger sprocket being provided with a link plate supporting portion which has an arcuate supporting face for bending the chain and radially supporting the chain simultaneously at least at two adjacent link rollers of the chain when the chain shifts from the smaller sprocket to the larger sprocket.

2. The sprocket assembly according to claim 1, wherein the link plate supporting portion is configured to hold a link plate of the chain running over a tooth of the larger sprocket substantially tangentially to a pitch circle of the larger sprocket.

3. The sprocket assembly according to claim 1, wherein the link plate supporting portion is provided by a separate retainer plate attached to said side surface of the larger sprocket.

4. The sprocket assembly according to claim 3, wherein the larger sprocket is formed with a step face continuous with the supporting face of the retainer plate.

5. The sprocket assembly according to claim 1, wherein the supporting face of the link plate supporting portion has a length capable of supporting a series of at least two link plates of the chain.

* * * * *